United States Patent [19]

Kaaden

[11] Patent Number: 4,793,796

[45] Date of Patent: Dec. 27, 1988

[54] APPARATUS FOR THE MANUFACTURE OF PLASTIC PARTS BY INJECTION MOLDING OR REACTION INJECTION MOLDING

[76] Inventor: Hans-Heinrich Kaaden, Friedrich-Herschel-Strasse 5, 8000 Munich 80, Fed. Rep. of Germany

[21] Appl. No.: 909,843

[22] Filed: Sep. 19, 1986

Related U.S. Application Data

[63] Continuation-in-part of Ser. No. 865,197, Apr. 1, 1986, Pat. No. 4,753,592.

[30] Foreign Application Priority Data

Sep. 26, 1985 [DE] Fed. Rep. of Germany ....... 3534255

[51] Int. Cl.$^4$ ............................................. B29C 45/70
[52] U.S. Cl. ................................. 425/572; 264/328.8; 425/588
[58] Field of Search ................ 425/588, 549, 566–575, 425/577, 589, 548, 564, DIG. 35, DIG. 221; 264/328.8, 328.14, 328.15, 328.16

[56] References Cited

U.S. PATENT DOCUMENTS

| | | | |
|---|---|---|---|
| 2,871,517 | 2/1959 | Allard | 264/328.8 X |
| 3,936,262 | 2/1976 | Hehl | 425/568 |
| 4,279,588 | 7/1981 | Gellert | 425/568 |

FOREIGN PATENT DOCUMENTS

| | | | |
|---|---|---|---|
| 4067 | 1/1974 | Japan | 425/588 |
| 166030 | 10/1983 | Japan | 264/328.8 |
| 181624 | 10/1983 | Japan | 425/572 |
| 183231 | 10/1983 | Japan | 425/588 |

*Primary Examiner*—Richard L. Chiesa
*Attorney, Agent, or Firm*—Collard, Roe & Galgano

[57] ABSTRACT

The invention relates to an injection molding machine for the manufacture of plastic parts from thermoplastic, thermoset and/or elastomer material by injection molding or reaction injection molding. The machine includes a multi-station locking unit of horizontal or vertical configuration designed to hold a number of molds and an associated injection unit for the simultaneous injection of the molds. The apparatus further includes two outer mold clamping plates, one of which is arranged on guide elements and movable thereon in the locking direction, and a center mold-holding part movably arranged on guide elements between the two mold clamping plates. The mold-holding part is provided with a heatable melt conduction system with sprue nozzles and has one half of a mold attached to each of its two sides. The center mold-holding part is designed as a mold clamping plate sectioned lengthwise in three parts relative to the locking direction. The parts of the sectioned mold clamping plate are kept together by a high-speed clamping device and have the melt conduction system arranged between the three parts so that it is possible to connect each melt conduction system to an injection unit and inject the associated mold separately or two different molds can be injected simultaneously.

4 Claims, 2 Drawing Sheets

APPARATUS FOR THE MANUFACTURE OF PLASTIC PARTS BY INJECTION MOLDING OR REACTION INJECTION MOLDING

This is a continuation-in-part of U.S. Ser. No. 865,197, filed Apr. 1, 1986.

BACKGROUND OF THE INVENTION

The present invention relates to an apparatus for the manufacture of plastic parts from thermoplastic, thermoset and/or elastomer material by injection molding or reaction injection molding. The apparatus includes a multi-station locking unit of horizontal or vertical configuration designed to hold a number of molds and an associated injection unit for the simultaneous injection of the molds. The apparatus further includes two outer mold clamping plates, one of which is arranged on guide elements and movable thereon in the locking direction, and a center mold-holding part movably arranged on guide elements between the two mold clamping plates. The mold-holding part is provided with a heatable melt conduction system with sprue nozzles and has one half of a mold attached to each of its two sides. The center mold-holding part is designed as a mold clamping plate sectioned crosswise relative to the locking direction for holding larger halves of a mold. The two parts of the sectioned mold clamping plate are kept together by a high-speed clamping device and have the melt conduction system arranged therebetween. Separate driving cylinders are fastened on the center mold clamping plate.

The injection molding machine described above is disclosed in my earlier filed application U.S. Ser. No. 865,197, the disclosure of which is hereby incorporated by reference, and permits an extremely economical manufacture of larger parts, in particular automobile body parts made of plastic by injection molding or reaction injection molding. By releasing the high-speed clamping device, the two parts of the center, section mold clamping plate can be displaced sideways with one half of the mold attached to each part, thereby completely exposing the melt conduction system and making the latter accessible on both sides.

The simultaneous injection of two identical molds is possible by means of the center, sectioned mold clamping plate.

The object of the present invention is to enhance the sectioned, center mold clamping plate so that a single mold can be injected or two molds of different shapes can be simultaneously injected.

SUMMARY OF THE INVENTION

According to the invention, this object is accomplished by providing the movable center mold clamping plate as a plate sectioned in three parts and arranging the melt conduction system between the three parts. According to another feature of the present invention, a separate injection unit can be associated with each part of the melt conduction system. Appropriately, the three-part mold clamping plate is clamped together by one or a number of high-speed clamping devices to form a single unit. The melt conduction system may be designed in the form of melt conduction rails.

By dividing the movable center mold clamping plate into three parts in accordance with the invention, it is possible to connect each melt conduction system to an injection unit and to inject the associated mold separately. Furthermore, two different molds can be injected at the same time by means of the center mold clamping plate.

Other objects and features of the present invention will become apparent from the following detailed description considered in connection with the accompanying drawing. It is to be understood, however, that the drawing is designed as an illustration only and not as a definition of the limits of the invention.

BRIEF DESCRIPTION OF THE DRAWINGS

In the drawings wherein similar reference characters denote similar elements throughout the several views.

DESCRIPTION OF THE PREFERRED EMBODIMENT

Figure 1:
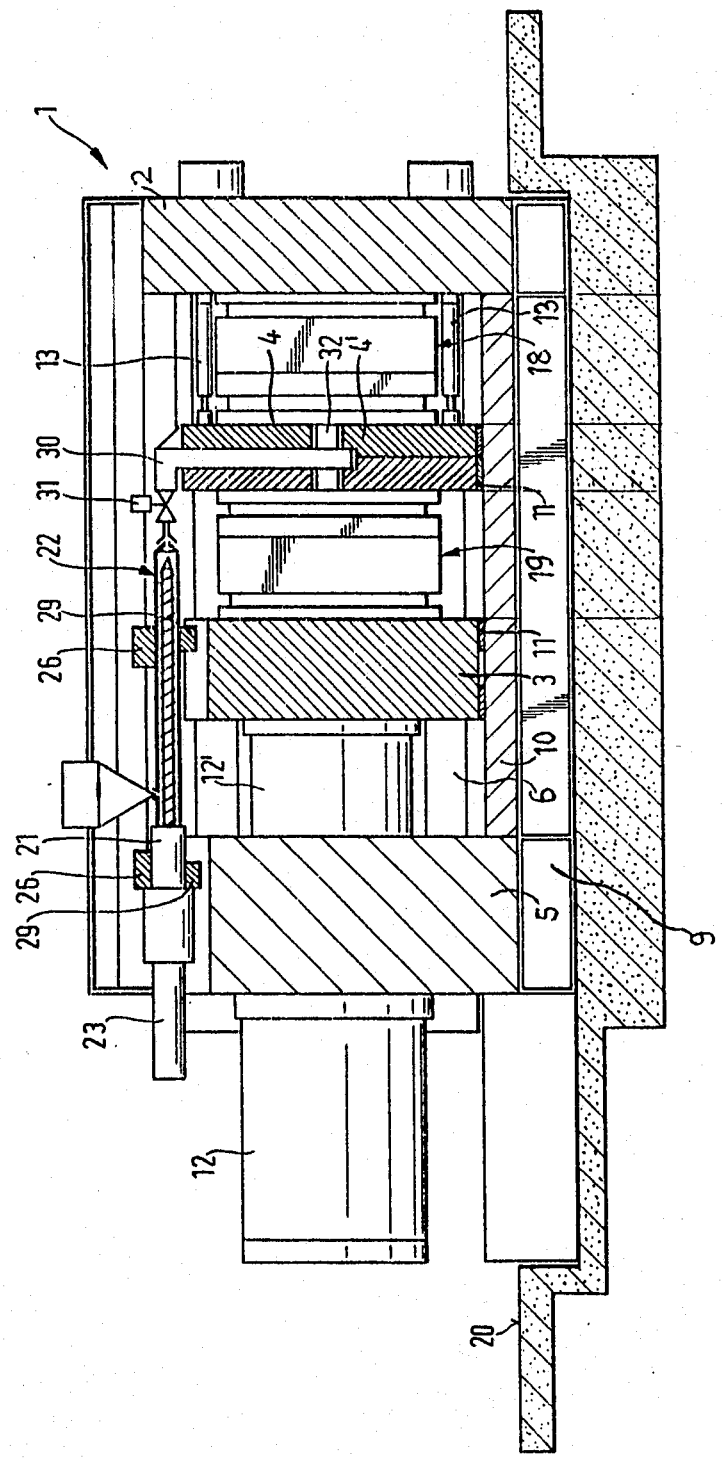
FIG. 1 is a cross-sectional elevation view of a multi-station locking unit with two molds closed; and a vertical cross-sectional view of a movable center mold clamping plate according to the present invention.

Referring to FIG. 1, there is shown a horizontally-oriented multi-station locking unit 1 arranged on a frame-like stand structure 9. The locking unit includes guide elements 6 which are supported on frame-like stand 9 located on floor 20.

Locking unit 1 includes two movable mold clamping assemblies 3 and 4 and one fixed clamping plate 2. Clamping plate 2, in the horizontally-oriented locking unit, is arranged.

Figure 2:
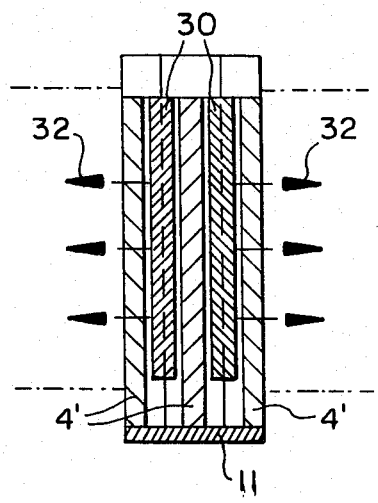

As clearly seen in FIG. 2, a preferred movable center mold clamping plate 4' consists of three parts with melt conduction system 30 arranged between the three parts. Melt conduction system 30 is comprised of melt conduction rails. The mold clamping plate 4' is clamped together by means of one or a number of high-speed clamping devices 12, thereby forming a single unit. Reference numeral 32 denotes the sprue nozzles and numeral 11 the bearing for the movable center mold clamping plate.

While only a single embodiment of the present invention has been shown and described, it will be obvious that many changes and modifications may be made thereunto without departing from the spirit and scope of the invention.

What is claimed is:

1. In an apparatus for the manufacture of plastic parts from thermoplastic, thermoset and/or elastomer material, said apparatus having a multi-station locking unit adapted to hold a number of molds, an associated injection unit for the simultaneous injection of the molds, two outer mold clamping plates, one plate of which is disposed on guide elements and movable thereon in the locking direction, a center mold-holding assembly movably arranged in guide elements between the two mold clamping plates, the center mold-holding assembly being provided with a heatable melt conduction system with sprue nozzles and having a section of a mold attached to each of its two sides, the center mold-holding assembly having a mold clamping plate having the melt conduction system arranged therein and separate driving cylinders being fastened on the mold clamping plate, the improvement comprising:

the mold clamping plate being sectioned crosswise to said locking direction into three parts with said melt conduction system being arranged in two parts between said three parts of said mold clamping plate.

2. The apparatus according to claim 1, wherein a separate injection unit is associated with each part of the melt conduction system.

3. The apparatus according to claim 2, wherein the mold clamping plate sectioned in three parts is clamped together in a single unit by at least one high-speed clamping device.

4. The apparatus according to claim 2, wherein said melt conduction system is designed in the form of melt conduction rails.

* * * * *